United States Patent [19]

Guffey et al.

[11] Patent Number: 4,880,657
[45] Date of Patent: Nov. 14, 1989

[54] SHORTENING COMPOSITIONS CONTAINING POLYOL POLYESTERS

[75] Inventors: Timothy B. Guffey, West Chester; Susan S. Abe, Mason, both of Ohio; Sherry R. Talkington, Florence, Ky.; Marko D. Mijac, Cincinnati, Ohio

[73] Assignee: The Procter & Gamble Company, Cincinnati, Ohio

[21] Appl. No.: 175,004

[22] Filed: Apr. 12, 1988

Related U.S. Application Data

[63] Continuation-in-part of Ser. No. 47,367, May 6, 1987, abandoned.

[51] Int. Cl.$^4$ .............................................. A23D 5/00
[52] U.S. Cl. ..................................... 426/601; 260/410; 426/603; 426/606; 426/607; 426/611; 426/613; 426/804; 514/23; 514/552
[58] Field of Search ............... 426/601, 603, 611, 607, 426/606, 613; 260/410, 410.6; 514/23, 552, 558

[56] References Cited

U.S. PATENT DOCUMENTS

| | | | |
|---|---|---|---|
| 2,999,022 | 9/1961 | Payne et al. | 426/606 X |
| 3,158,490 | 3/1964 | Baur et al. | 426/606 |
| 3,600,186 | 8/1971 | Mattson et al. | 426/603 |
| 3,954,976 | 5/1976 | Mattson et al. | 424/180 |
| 3,963,699 | 6/1976 | Rizzi et al. | 260/234 R |
| 4,005,195 | 1/1977 | Jandacek | 424/180 |
| 4,005,196 | 1/1977 | Jandacek | 424/180 |
| 4,034,083 | 7/1977 | Mattson | 424/180 |
| 4,241,054 | 6/1980 | Volpenhein et al. | 424/180 |
| 4,264,583 | 4/1981 | Jandacek | 424/240 |
| 4,368,213 | 1/1983 | Hollenbach et al. | 426/590 |
| 4,382,924 | 5/1983 | Berling et al. | 536/119 |
| 4,461,782 | 7/1984 | Robbins et al. | 426/549 |
| 4,469,710 | 9/1984 | Rielly et al. | 426/541 |
| 4,517,360 | 5/1985 | Volpenhein | 536/119 |
| 4,518,772 | 5/1985 | Volpenhein | 536/119 |
| 4,546,003 | 10/1985 | Izzo et al. | 426/581 |
| 4,568,556 | 2/1986 | McCoy | 426/603 |
| 4,571,347 | 2/1986 | Izzo et al. | 426/581 |
| 4,611,055 | 9/1986 | Yamamoto et al. | 536/119 |

OTHER PUBLICATIONS

Weiss, *Food Oils and Their Uses*, Second Edition, Avi Publishing Co., Westport, Conn., pp. 23, 76–79 and 121–126 (1983).
Swern, *Bailey's Industrial Oil and Fat Products*, Third Edition, Interscience Publishers, New York, pp. 276–277, 280, 300–302, 305 (1964).
A.O.C.S. Official Method Cc 16-60, pp. 1–3 (1973).
Applewhite, Bailey's Industrial Oil and Fat Products, 4th Ed., vol. 3, John Wiley & Sons, New York, 1985, pp. 89–91.
Fattat et al., "Short Term Study of Sucrose Polyester a Nonabsorbable Fat-Like Material as a Dietary Agent for Lowering Plasma Cholesterol", The American Journal of Clinical Nutrition 29, Nov. 1976, pp. 1204–1215.
Glueck et al., The American Journal of Clinical Nutrition 32; Aug. 1979, pp. 1636–1644.

*Primary Examiner*—Donald E. Czaja
*Assistant Examiner*—Celine T. Callahan
*Attorney, Agent, or Firm*—Gary M. Sutter; Ronald L. Hemingway; Richard C. Witte

[57] ABSTRACT

Disclosed are preferred shortenings made with polyol polyesters. The Solid Fat Content curve and penetration of the shortenings is adjusted to increase smoothness and decrease graininess. Also described are food compositions that have enhanced flavors from the addition of particular sucrose polyesters.

17 Claims, 1 Drawing Sheet

SHORTENING COMPOSITIONS CONTAINING POLYOL POLYESTERS

RELATED APPLICATION

This is a continuation-in-part application of Ser. No. 047,367, filed May 6, 1987.

FIELD OF THE INVENTION

The present invention relates to the area of polyol polyesters and their use in shortenings and foods.

BACKGROUND OF THE INVENTION

A number of references disclose shortenings and foods made with polyol polyesters. For example, U.S. Pat. No. 3,600,186 of Mattson et al., issued Aug. 17, 1971, discloses low calorie fat-containing food compositions wherein from about 10% to about 100% of the total fat is a sugar or sugar alcohol polyester having at least 4 fatty acid ester groups, with each fatty acid having from about 8 to about 22 carbon atoms. The polyesters are said to be useful as a partial or complete replacement for normal triglyceride fat in salad or cooking oils, or plastic shortenings for use in frying, cake making, bread making, or the like. A plastic shortening is disclosed made with 50% sucrose octastearate.

U.S. Pat. No. 4,034,083 of Mattson, issued July 5, 1977, discloses polyol fatty acid polyesters having at least four fatty acid ester groups that are fortified with fat-soluble vitamins and used in food or pharmaceutical compositions for treating and/or preventing hyperchloesterolemia. Cooking oils and plastic shortenings are specifically mentioned.

In U.S. Pat. Nos. 4,005,195 and 4,005,196 of Jandacek et al., issued Jan. 25, 1977, polyol polyesters such as sucrose polyesters are used in combination with fat-soluble vitamins and anti-anal leakage agents to provide food and pharmaceutical compositions for treating and/or preventing hypercholesterolemia. The patents contain claims for food compositions in which the polyol polyesters and anti-anal leakage agents comprise 10% to 100% of the total fat ingredients.

U.S. Pat. No. 4,461,782 of Robbins, et al., issued July 24, 1984, discloses low calorie baked products comprising from about 12% to about 60% liquid polyol polyester and from about 25% to about 85% microcrystalline cellulose or a mixture of microcrystalline cellulose and flour in a weight ratio of cellulose to flour of at least 1:1. The examples disclose cakes and wafers.

U.S. Pat. No. 4,626,441 of Wolkstein, issued Dec. 2, 1986, describes sweetener-bulking agent compositions suitable for use in dietetic frozen desserts. The sweetener comprises mixtures of aspartame with other dietetic sweeteners. Sucrose polyester is among the group of possible bulking agents. A mellorine frozen dessert is made with 0.4–16% sucrose polyester.

U.S. Pat. No. 4,368,213 of Hollenbach et al., issued Jan. 11, 1983, discloses milkshake-like beverages prepared by mixing sucrose polyester emulsions with edible liquids such as skim milk or buttermilk. For example, a beverage can be prepared from 100 grams of skim milk and 40 grams of an emulsion made up of 50% liquid sucrose polyester, 5% cocoa butter, 0.8% polyglycerol ester, 1.5% 2,3-butanediol monopalmitate, and 15% sucrose.

While these references disclose shortenings made with polyol polyesters, none of the references addresses the problem of reducing graininess in those shortenings.

In addition, none of the references recognizes that polyol polyesters can be combined with natural and synthetic flavor systems in foods to enhance their overall flavor display and appreciation.

It is, therefore, an object of the present invention to provide shortenings made with polyol polyesters.

It is another object of the present invention to make shortenings that are creamy instead of grainy.

It is a further object of the present invention to provide food compositions in which the flavor is enhanced by the addition of sucrose polyesters.

These and other objects of the invention will become evident from the disclosure herein.

All percentages are by weight unless otherwise defined.

SUMMARY OF THE INVENTION

Figure 1:
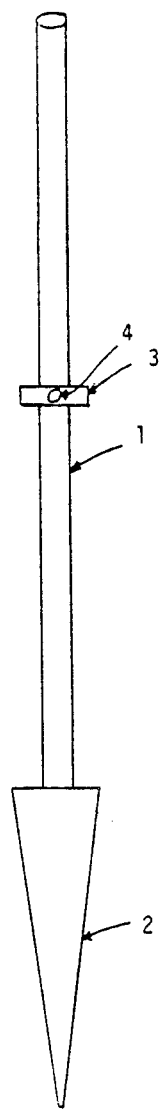
FIG. 1 illustrates the penetrating device used to measure the penetration (firmness) of the present shortenings.

Disclosed are preferred shortenings made with polyol polyesters. The Solid Fat Content curve and penetration of the shortenings are adjusted to increase smoothness and decrease graininess. Also described are food compositions that have enhanced flavors from the addition of particular sucrose polyesters.

DETAILED DESCRIPTION OF THE INVENTION

Consumers expect creamy appearance in solid shortenings as a sign of good quality. Shortenings which are brittle, chunky, grainy, sandy, or in other ways not smooth and creamy in appearance are deemed to be low in quality. The present invention defines a parameter which is critical to achieving creamy appearance in shortenings containing polyol polyesters, in particular sucrose polyesters. Related shortenings are described generally in *Bailey's Industrial Oil and Fat Products*, 4th ed., Vol. 3, at p. 86 (1985).

The present development is a relatively flat Solid Fat Content (SFC) slope for the shortenings, relative to processing and usage temperatures. Specifically, the level of solids at temperatures encountered during the processing, packing, warehousing, shipping and subsequent consumer storage conditions must be relatively flat. If the solids profile is not relatively flat across this temperature range, finished product which melts and recrystallizes in moving across this range will be brittle, chunky or in other ways not smooth and creamy in appearance. The temperature range of 50° F. (10°) to 105° F. (41° C.) is representative of the typical temperature range a shortening product would encounter during processing, packing, warehousing, shipping, and subsequent consumer storage.

It is important to note the distinction between creamy appearance and creamy consistency. It is possible for a shortening to not be creamy in appearance, but to have a creamy consistency. That is, a grainy, brittle appearing shortening may be easily worked into a dough or batter. However, creamy appearance is an important consumer benefit.

"Graininess" is defined herein by the appearance of macroscopic agglomerations which are not smooth but are coarse in appearance, for example when the shortening is scooped out of a container with a spoon. "Brittleness" is determined by the lack of smoothness when a utensil such as a spoon is scraped across the surface of the product.

The present invention, then, relates to a shortening composition comprising:

(a) from about 10% to about 80% by weight intermediate melting polyol fatty acid polyesters having at least 4 fatty acid ester groups; wherein the polyols are selected from the group consisting of sugars and sugar alcohols containing 4 to 8 hydroxyl groups, and mixtures thereof, and wherein each fatty acid group has from about 8 to 22 carbon atoms; and wherein the polyol polyesters have:
  (i) a non-Newtonian plastic rheology at 100° F. (37.8° C.) and in particular a yield stress of not less than about 150 dynes/cm$^2$, and a viscosity of not less than about 15 poise at 100° F. (37.8° C.) after 10 minutes of steady shear at 10 sec.$^{-1}$,
  (ii) a liquid/solid stability of not less than 90 percent at 100° F. (37.8° C.), and
  (iii) an iodine value between about 25 and about 55;
(b) from about 20% to about 88% by weight soft oil comprising from about 0% to about 50% polyol fatty acid polyesters and from about 20% to about 88% triglycerides;
(c) from about 2% to about 20% by weight hardstock fat comprising from about 0% to about 10% hardstock polyol fatty acid polyesters and from about 2% to about 20% hardstock triglycerides;
(d) from about 0% to about 50% by weight intermediate melting triglycerides; and
(e) from about 0% to about 15% by weight other shortening ingredients;
(f) wherein the shortening has a Solid Fat Content (SFC) such that the overall slope of the SFC curve between 50° F. (10° C.) and 105° F. (41° C.) is between about 0.00 and about −0.40; and
(g) wherein the shortening has a penetration between about 120 mm/10 and about 400 mm/10 at 70° F. (21° C.).

As indicated above, variations in SFC slope from about 0.00 to about −0.40 measured as "change in percent solids/change in temperature (°F.)" are acceptable for providing a solid shortening with a creamy appearance. For example, a change in solids of 10% over the temperature range of 50° F. (10° C.) to 105° F. (41° C.) would be acceptable, whereas a change in solids of 30% over the same temperature range would not be acceptable. The SFC slope will preferably range from about 0.00 to about −0.30, and most preferably from about 0.00 to about −0.20.

The penetration or firmness of the shortening at 70° F. (21° C.) is also critical to providing a creamy appearance. The shortening has a penetration between about 120 mm/10 and about 400 mm/10 at 70° F. (21° C.). Preferably, the shortening has a penetration between about 150 mm/10 and about 250 mm/10 at 70° F. (21° C.).

As well as the overall SFC curve slope between 50° F. (10° C.) and 105° F. (41° C.), the maximum slope between any given 20° F. (11° C.) temperature range between 50° F. (10° C.) and 105° F. (41° C.) can also be important for assuring a creamy appearance. Preferably, the shortening will have an SFC curve such that the maximum negative or positive slope of the SFC curve between any given 20° F. (11° C.) temperature range is about 0.40, more preferably about 0.30, and most preferably about 0.20.

Processing temperatures are preferably controlled to avoid remelting frozen solids during the processing, for example, by putting in too much mechanical work.

A. Intermediate Melting Polyol Polyesters

To achieve the desired smoothness and creaminess, the present shortening comprises from about 10% to about 80% by weight intermediate melting polyol fatty acid polyesters having particular rheological properties, and preferably from about 33% to about 80% by weight of the polyol polyesters.

The polyol polyesters of the present invention are sugar or sugar alcohol fatty acid esters esterified with at least four fatty acid groups, or mixtures thereof. The term "sugar" is used herein in its conventional sense as generic to mono-, di-, and trisaccharides. The term "sugar alcohol" is also used in its conventional sense as generic to the reduction product of sugars wherein the aldehyde or ketone group has been reduced to an alcohol. The fatty acid ester compounds are prepared by reacting a monosaccharide, disaccharide, trisaccharide or sugar alcohol with fatty acid as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable for the practice of this invention since it only contains 3 hydroxyl groups; however, the sugar alcohol derived from erythrose, i.e., erythritol, contains 4 hydroxyl groups and is thus suitable. Among 5 hydroxyl containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups. Examples of suitable trisaccharides are maltotriose and raffinose.

Preferred polyols for preparing the polyesters for use in the present invention are selected from the group consisting of erythritol, xylitol, sorbitol, glucose and sucrose. Sucrose is especially preferred. Specific, but non-limiting, examples of sucrose fatty acid polyesters suitable for use herein are polyesters made by esterifying sucrose with a blend of partially and nearly completely hardened soybean oil methyl esters, for example, polyesters having the following properties: (1) octaester content 84.5%; SFC at 50° F. (10° C.) of 71.8, at 70° F. (21° C.) of 64.2, at 80° F. (27° C.) of 51.1, at 92° F. (33° C.) of 33.2, and at 105° F. (41° C.) of 9.5; fatty acid composition of 11.5% $C_{16}$, 54.2% $C_{18}$, 17.9% $C_{18:1}$, 14.2% $C_{18:2}$, 1% $C_{18:3}$, 0.5% $C_{20}$, and 0.3% $C_{22}$; and I.V. of 42.6; or (2) octaester content of 92.1%, SFC at 50° F. (10° C.) of 61.2, at 70° F. (21° C.) of 48.4, at 80° F. (27° C.) of 36.2, at 92° F. (33° C.) of 19.2, and at 105° F. (41° C.) of 3.1; fatty acid composition of 9.8% $C_{16}$, 50.6% $C_{18}$, 21.6% $C_{18:1}$, 15.7% $C_{18:2}$, 1% $C_{18:3}$, 0.5% $C_{20}$ and 0.3% $C_{22}$; and I.V. of 48.6.

The polyol starting material having at least four hydroxyl groups must be esterified on at least four of the —OH groups with a fatty acid containing from about 8 to about 22 carbon atoms, and preferably from about 14 to about 18 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic acid. The fatty acids can be derived from naturally occurring or synthetic fatty acids; they can be saturated or unsaturated, including positional and geometrical isomers. The fatty acids esterified to the polyol molecule are of mixed chain length to produce the desired physical properties.

The polyol fatty acid polyesters useful in this invention must contain at least four fatty acid ester groups. Polyol fatty acid polyester compounds that contain three or less fatty acid ester groups are digested in and the products of digestion are absorbed from the intestinal tract much in the manner of ordinary triglyceride fats, whereas polyol fatty acid polyester compounds that contain four or more fatty acid ester groups are substantially non-digestible and consequently non-absorbable by the human body. It is not necessary that all of the hydroxyl groups of the polyol be esterified with fatty acid, but it is preferable that the polyester contain no more than two unesterified hydroxyl groups. Most preferably, substantially all of the hydroxyl groups of the polyol are esterified with fatty acid, i.e., the compound is substantially completely esterified.

The intermediate melting polyol polyesters of the present invention must have a non-Newtonian plastic rheology at 100° F. (37.8° C.). In particular, the polyesters have a yield stress of not less than about 150 dynes/cm$^2$, and a viscosity of not less than about 15 poise at 100° F. (37.8° C.) after 10 minutes of steady shear at 10 sec.$^{-1}$. The polyesters must also have a liquid/solid stability of not less than 90 percent at 100° F. (37.8° C.).

The polyol polyesters can be a single type of polyester or a mixture of polyesters. It is not critical that each type of polyester has the above-mentioned rheology as long as the polyol polyesters as a whole have this rheology.

Viscosity and yield stress are known rheological properties and can be measured by use of an instrument such as a plate and cone viscometer (e.g., a Ferranti-Shirley viscometer, manufactured by Ferranti Electric, Inc., 87 Modular Ave., Commack, NY 11725). Additional details are provided below under the Analytical Methods section.

By "intermediate melting" is meant that the polyol fatty acid polyesters have an iodine value between about 25 and about 55, and preferably between about 36 and about 55. The term "iodine value", often seen as I.V., is well known in oil technology and refers to the amount of iodine that will add to the unsaturated bonding of a 100 gram sample of any oil or oil-like material that contains fatty acids. The higher the I.V. the higher the degree of unsaturation, and conversely the lower the I.V. the lower the degree of unsaturation. Also, in general the higher the I.V. the lower the melting point of the material, and the lower the I.V. the higher the melting point of the material. Iodine value is measured by the standard Wijs titration.

A preferred polyol polyester for use in the present invention is a mixture of the hexa-, hepta-, and octa-esters of sucrose and medium- and long-chain fatty acids obtained from edible fats and oils and/or fatty acid sources. Fatty acids with chain lengths of 8 to 22 carbon atoms can be used. This material has: (a) a total content of octa-, hepta- and hexa-esters of not less than 95 percent; (b) an octa-ester content of not less than 70 percent; (c) a content of the penta- and lower esters of not more than 3 percent.

The polyol fatty acid polyesters suitable for use herein can be prepared by a variety of methods known to those skilled in the art. These methods include: transesterification of the polyol with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. As an example, the preparation of polyol fatty acid esters is described in U.S. Pat. Nos. 3,963,699 and 4,517,360 (herein incorporated by reference).

B. Other Fats

In addition to the intermediate melting polyol polyesters, certain other types of fat materials are incorporated into the present shortening to produce the desired creaminess properties. Specifically, the present shortening comprises from about 20% to about 88% by weight soft oil, from about 2% to about 20% by weight hardstock fat, and from about 0% to about 50% by weight intermediate melting triglycerides. Preferably, the shortening comprises from about 40% to about 65% by weight soft oil, from about 3% to about 12% by weight hardstock fat, and from about 2% to about 15% by weight intermediate melting triglyceride.

Soft Oil

The soft oil is a liquid oil which acts as a softener in the present shortening. It provides fluidity to the shortening so that it is creamy and can be easily scooped. Suitable soft oils have an iodine value (IV) between about 70 and about 130. If an intermediate melting fat is used in the present shortening, it is preferred that the soft oil have an IV between about 80 and about 130, to adjust for the solids introduced by the intermediate melting fat.

The soft oil comprises from about 0% to about 50% polyol fatty acid polyesters and from about 20% to about 88% triglycerides. Triglyceride soft oils can be derived from animal, vegetable or marine sources, including naturally occurring oils such as cottonseed oil, soybean oil, rapeseed oil, low erucic acid rapeseed oil, canola oil, sunflower oil, corn oil, peanut oil, safflower oil, and the like, or mixtures thereof.

The soft oil can also be a liquid polyol fatty acid polyester having an iodine value between about 60 and about 130. The polyol fatty acid polyesters are of the same general type as those described above for the intermediate melting polyol polyesters. However, in order to provide the liquid polyol polyesters for use as the soft oil, at least about half of the fatty acids incorporated into a polyol molecule must be unsaturated. Oleic and linoleic acids, and mixtures thereof, are especially preferred.

The following are non-limiting examples of specific liquid polyol fatty acid polyesters suitable for use as the soft oil: sucrose tetraoleate, sucrose pentaoleate, sucrose hexaoleate, sucrose heptaoleate, sucrose octaoleate, glucose tetraoleate, the glucose tetraesters of soybean oil fatty acids (unsaturated), the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

Triglyceride oils or polyol polyesters can be partially hydrogenated to prevent flavor deterioration caused by the more highly unsaturated components such as the triglycerides having linolenic acid residues. The partial hydrogenation of oils can be achieved by any of a number of art recognized techniques, all of which involve contacting the oil with gaseous hydrogen in the presence of a catalyst such as nickel and/or copper. See, e.g., *Bailey's Industrial Oil and Fat Products*, supra, pp. 793 et seq. This partially hydrogenated soybean oil is generally winterized to remove solids to provide a soft oil having the required iodine value. See, e.g., *Bailey's Industrial Oil and Fat Products*, supra, pp. 1007 et seq. for winterization techniques. It is also desirable that the soft oil, e.g., partially hydrogenated soybean oil, be refined, bleached and deodorized in accordance with conventional practice. See, e.g., *Bailey's Industrial Oil and Fat Products*, supra, pp. 719 et seq. and 897 et seq.

Hardstock Fat

The hardstock fat comprises from about 0% to about 10% hardstock polyol fatty acid esters and from about 2% to about 20% hardstock triglycerides. The hardstock provides plasticity to the present shortening in combination with the other fat materials, and it is also important for providing high temperature heat stability. Additionally, the hardstock affects the crystal structure of the shortening. The addition of more hardstock tends to flatten out the solid fat content profile of the shortening.

The triglyceride hardstock fat is a substantially completely hydrogenated triglyceride fat or oil having an iodine value not exceeding about 12. The hardstock fat can be obtained by hydrogenating naturally occurring oils such as palm oil, cottonseed oil, soybean oil, sunflower oil, corn oil, peanut oil, and the like, or mixtures thereof. Preferred hardstocks are those that are triglycerides containing palmitic-stearic-palmitic or palmitic-stearic-stearic fatty acids in the 1, 2 and 3 positions. Certain vegetable oils or fractions thereof contain these predominantly beta-prime triglycerides, for example, hardened palm oil and hardened cottonseed oil.

Hardened polyol fatty acid polyesters having an iodine value not more than about 12 are also useful as the hardstock fat. The polyol fatty acid polyesters are those described generally above. However, the hardstock polyesters contain fatty acids that are more saturated than unsaturated, and more longer than shorter fatty acid chains. Typical examples of hardstock polyol polyesters include sucrose octastearate, sucrose octapalmitate, sucrose heptasterate, xylitol pentastearate, galactose pentapalmitate, and the like.

Intermediate Melting Triglycerides

The present shortening additionally comprises from about 0% to about 50% intermediate melting triglyceride fats. These intermediate melting triglycerides contribute to the crystal structure of the shortening and increase its oxidative stability. Further, the intermediate melting triglyceride can be beneficial in increasing the plastic range of the shortening, and in adjusting the shortening's solid fat content profile. Suitable intermediate melting triglycerides have an IV between about 25 and about 60. Triglyceride oils which can be hydrogenated to yield an intermediate melting fat are soybean oil, palm oil, cottonseed oil, peanut oil, coconut oil, and the like, or mixtures thereof. Rearranged fats or oils prepared by interesterification can also be used herein. Preferred intermediate melting fats are hydrogenated to an IV of about 35 to about 55.

These oils and the present shortenings can be processed with one or more of the following processes: hydrogenation, winterization, dewaxing, interesterification, etc. Any standard processing method can be used to make the present shortenings.

C. Other Shortening Ingredients

The present shortening also comprises from about 0% to about 15% by weight of other shortening ingredients. Various additives can be used herein provided that they are edible and aesthetically desirable and do not have any detrimental effects on the shortenings. The shortening can normally contain minor amounts of optional flavorings, emulsifiers, anti-spattering agents, anti-sticking agents, anti-oxidants, or the like. As with standard shortenings, nitrogen can also be added to the shortening during processing to improve the lightness of color of the product.

D. Enhancement of Food Flavors

It has been found that the overall flavor display and appreciation of natural and synthetic flavor systems in certain foods can be enhanced by the addition of sucrose polyesters.

Butter-flavored shortening containing sucrose polyester was perceived to have more butter flavor than a similar triglyceride system containing the same concentration of butter flavor. Additionally, these flavor advantages have been observed in several foods prepared with sucrose polyester shortenings versus triglyceride shortenings. These foods include french fried potatoes, butter-flavored pie crusts, and cheese-flavored pie crusts.

The flavor advantages for foods prepared with sucrose polyester shortenings were demonstrated in paired comparison taste tests using a base of 35-65 panelists. In all cases, the foods prepared with the sucrose polyester shortenings were perceived to have more flavor than foods prepared with similar triglyceride shortenings.

Accordingly, another aspect of the present invention comprises adding sucrose polyesters to a food to improve the flavor of the food, where the polyesters have at least 4 fatty acid ester groups, with each fatty acid having from about 8 to about 22 carbon atoms. The sucrose polyesters are described in detail above.

The present method for increasing the flavor display of foods is useful with a variety of food products. For example, the sucrose polyesters can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, baked farinaceous snack foods, and other baked salted snacks.

Moreover, the sucrose polyesters can be contained in foods that are fried in oil, such as Pringle's, potato chips, corn chips, tortilla chips, other fried farinaceous and/or salted snack foods, French fries, doughnuts, fried pies (e.g., turnovers), crullers, and fried meats and poultry, e.g., chicken and fish. The polyesters are also useful in foods that require reheating, such as foods that were previously pan fried or deep fried, including fish, meat, potatoes and other vegetables.

Dairy products and artificial dairy products can be made with the present sucrose polyesters as well. For example, they are useful in the production of butter, dairy spreads, ice cream, ice milk, ices, sherbets, sorbets, mellorine, milk shakes, other fat-containing frozen desserts and beverages, yogurt, and cheeses, including natural cheeses, processed cheeses, aged cheese, cream cheese, cottage cheese, cheese foods and cheese spreads. The sucrose polyesters can be used to make milk, cream, sour cream buttermilk, and coffee creamer (frozen or powdered). Other dairy beverages and dairy desserts such as puddings and custards can also be made.

Among the other uses for the present sucrose polyesters are the production of sweet goods and confections, for example, candies, chocolates, chocolate confections, chocolate coatings and other coatings, frostings and icings, syrups, whipped toppings (frozen or aerosol), and cream fillings, fruit fillings, and other fillings.

E. Analytical Methods

1. Solid Fat Content:

The method for determining Solid Fat Content (SFC) values of a fat by PMR is described in Madison and Hill, *J. Amer. Oil, Chem. Soc.*, Vol. 55 (1978), pp. 328-31 (herein incorporated by reference). Before determining SFC values, the shortening sample is heated to a temperature of 140° F. (60° C.) for at least 0.5 hours or until the sample is completely melted. The melted sample is then tempered at a temperature of 32° F. (0° C.) for 15 minutes, 80° F. (27° C.) for 30 minutes, and 32° F. (0° C.) for 15 minutes. After tempering, the SFC value of the shortening at temperatures of 50° F. (10° C.), 70° F. (21° C.), 80° F. (27° C.), 92° F. (33° C.) and 105° F. (41° C.) is determined by pulsed magnetic resonance (PMR) after equilibrating for 30 minutes at each temperature.

2. Measurement of Penetration:

Penetration is a measure of the firmness or consistency of a shortening. Penetration is measured by measuring the distance a given weight (47 grams) of defined shape will penetrate the shortening after falling from a height of 2 centimeters above the surface of the shortening. The firmness of the shortening is related to its composition and character, and to the temperature of the sample at the time of measurement. A standard method for measuring penetration is described in A.O.C.S. Official Method Cc 16-60 (incorporated by reference herein). However, the method for measuring penetration values of the present invention is modified in several respects, for example, a modified Precision Universal Penetrometer (manufactured by Precision Scientific Co., Chicago, Ill.) is used to measure the penetration. The penetrating device comprising the shaft and needle (or "cone") is also modified.

Apparatus:

Constant temperature boxes or room, automatically controlled to maintain the temperature at 85° F.±1° F. (29.5° C.±0.5° C.) and 70°±1° F. (21.1° C.±0.5° C.).

A specially designed needle, shaft and collar weighing 47 grams total, and described below in detail.

A titer thermometer with a temperature range of 20° to 40° C. (68° F. to 104° F.) or 15° to 35° C. (59° F. to 95° F.), reading to 0.1° C. (0.2° F.).

A sample container, either a 1 lb. or 3 lb. can.

A Precision Universal Penetrometer, modified as described below. The penetrometer is a mechanical device which provides in one unit a support or housing to grip and release the penetrating device (shaft and needle), a platform to support the sample, spirit level and adjustments to maintain the penetrometer in a level position and a depth gauge graduated to allow reading the depth of penetration in 0.1 mm units.

Specially Designed Shaft and Needle:

The penetrating device comprising a shaft 1 and needle 2 (or "cone") is illustrated in FIG. 1. A 9" long hollow steel rod having a 3/16" outer diameter is used for the shaft. At the end of the shaft is a 2" long hollow stainless steel needle or cone. The point end of the needle has a 1/32" diameter, and the enlarged end has a 19/32" diameter. The needle can be unscrewed from the shaft to insert weights into the hollow needle. A magnesium collar 3 with a set screw 4 is positioned around the shaft, about 4¼" from the end opposite the needle. The collar is 7/16" in diameter and ⅜" thick. The penetrating device as a whole, including the collar, must weigh 47 grams.

Precision Universal Penetrometer Modification:

In placing the shaft and needle in the housing of the instrument, the contact finger on the depth gauge is positioned below the collar. The collar is adjusted on the shaft so as to allow the depth gauge its full travel of 520 units. This is accomplished by moving the shaft upward until the needle is about two centimeters below the bottom of the housing and then sliding the collar up against the top of the housing and tightening the set screw. Next the shaft is lowered exactly two centimeters. Using the gauge block adjust the depth gauge contact finger all the way up against the collar using the adjuster screw. Remove the shaft and needle, pin the collar to the shaft and adjust the weight to 47 grams.

Conditioning of Sample:

The shortening sample is tempered at 85°±1° F. (29.5°±0.5° C.) for 24 hours and then stored at 70°±1° F. (21.1° C.±0.5° C.) for 24 hours.

Checking the Penetrometer:

Check the needle rise against the 2 cm. gauge-block as follows: With the indicator and depth gauge in the zero position lower the penetrometer head by means of the course adjusting screw until the point of the needle just touches the pad block (large diameter block) then lock the screw in this position. Squeeze the clutch trigger and raise the needle to the extreme top position (collar touching the top of the housing). Check the distance between the needle point and pad by placing the 2 cm. gauge block on the pad and carefully passing it under the needle point; the needle point should just clear the 2 cm. gauge block. If the distance so determined is not exactly 2 cm., adjust the depth gauge adjusting screw until the rise and fall of the needle is exactly 2 cm. Set the depth gauge indicator needle to read zero by removing the face plate cover and loosening the knurled nut holding the needle in place. This check should be made once before each series of measurements.

Operation:

If possible make all penetrations in a room controlled at 70°±1° F. (21.1°±0.5° C.). If this is impossible, conduct the actual penetration operation immediately after the sample is removed from the 70° F. (21.1° C.) box. Smooth the surface of the sample by scraping, but do not disturb the contents of the can below about 0.25" of the original surface of the shortening. Immediately place the sample container on the shelf of the penetrometer, which has been leveled previously by means of the leveling screws in the base. Penetrate each sample at three or more points at least one inch apart and at least one inch from the side of the container, being certain to clean the needle by wiping with a tissue between each penetration. Under no circumstances should the needle be removed from the shaft for cleaning purposes. (Insert the thermometer in the center of the sample up to its immersion mark and record temperature to 0.1° C. (0.2° F.). The temperature at which the penetration test is made should be 21.1°±0.5° C. [70°±1° F.]) The average of the penetrations is recorded as the uncorrected penetration. This value is corrected for penetration temperature deviation as follows: a correction of 0.5 points for every 0.1° C. (0.2° F.) above or below 21.1° C. (70° F.) should be made. If below 21.1° C. (70° F.), add the correction; if above, subtract.

Bring the indicator to zero by pulling up on the depth gauge until it stops, then squeeze the clutch trigger and again pull up on the depth gauge until it reaches zero. Release the clutch trigger. If the indicator does not read zero, adjust with the zero setting screw. By means of the coarse adjusting screw, bring the needle down until its point just touches the surface of the sample. Grasp the top of the needle, squeeze the clutch trigger and pull the needle up as far as it will go. This will raise the needle two centimeters above the sample. Release the clutch trigger. Push the depth gauge down as far as it will go.

Release the needle by squeezing the clutch trigger. In operating the clutch trigger, grasp the finger grip firmly with the forefinger, and with the thumb depress the clutch trigger quickly as far down as it will go. Then immediately pull the depth gauge up until it stops and read the dial. The reading is the penetration in tenths of a millimeter (mm/10).

3. Rheology Measurements:

a. Sample Preparation: The polyol polyester is heated until it completely melts and is thoroughly mixed. Ten grams of the melted sample is weighed into a pre-heated 20 ml glass vial. The sample is then allowed to recrystallize at 100° F.±5° F. (37.8° C.±3° C.) for 24 hours. After the 24 hour time period has elapsed, the sample is taken to the viscometer and the viscosity and yield stress are measured.

b. Ferranti-Shirley Viscometer Operation Procedure: A Ferranti-Shirley viscometer equipped with a 600 gm torque spring is used for the viscosity and yield stress measurements of the polyol polyester. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds, and then the cone rotation and recording are started. A rheogram for the polyol polyester is recorded and analyzed to determine the viscosity and yield stress. Viscosity is measured at 10 seconds$^{-1}$ after 10 minutes of steady shear. Yield stress is measured at zero time and is the stress required to achieve deformational flow.

4. Liquid/Solid Stability Measurement: The polyol polyester sample is heated until it completely melts and is thoroughly mixed. The sample is then poured into Beckman #344062 4.4 ml. centrifuge tubes to capacity. The tubes are immediately transferred to a 100° F.±5° F. (37.8° C.±3° C.) constant temperature room and allowed to recrystallize undisturbed for 24 hours. The samples are then centrifuged at 60,000 rpm in a Beckman Model L8 70M centrifuge having a Beckman Model SW 60 head (Beckman Instruments, Palo Alto, Calif.) for one hour at 100° F. (37.8° C.) (the centrifuge and centrifuge head is previously equilibrated at 100° F. [37.8° C.]). The maximum force on the samples is 485,000 G's (i.e., the force at the bottom of the centrifuge tubes). The liquid/solid stability is then calculated as follows:

Liquid/Solid Stability =

$$\frac{100 \times (\text{total volume of sample} - \text{volume of liquid})}{\text{total volume of sample}}$$

The following examples are intended only to further illustrate the invention and are not intended to limit the scope of the invention which is defined by the claims.

EXAMPLE 1

Two different shortening products are prepared. The following formulations are used:

| Shortening A | |
|---|---|
| 58.5% | Liquid soybean oil, iodine value of about 107 |
| 23.0% | Intermediate melting sucrose polyesters made from a blend of partially and nearly completely hardened soybean oil methyl esters (12% solids at body temperature, I.V. 44.8, viscosity 30 poise, liq./sol. stability >95%) |
| 10.0% | Sucrose polyester made from nearly completely hardened soybean oil methyl esters, and having an iodine value of 8 |
| 4.5% | Emulsifier (mono- and diglycerides) |
| 4.0% | Nearly completely hardened palm oil, iodine value of about 3 |
| 100.0% | |

| Shortening B | |
|---|---|
| 53.5% | Liquid soybean oil, iodine value of about 107 |
| 35.0% | Intermediate melting sucrose polyesters made from a blend of partially and nearly completely hardened soybean oil methyl esters (12% solids at body temperature |
| 7.0% | Nearly completely hardened palm oil, iodine value of about 3 |
| 4.5% | Emulsifier (mono- and diglycerides) |
| 100.0% | |

The shortenings are plasticized by a freeze/pick process, and nitrogen gas is dispersed in the shortenings for appearance.

The shortenings have the following physical characteristics:

| Solid Fat Content | Shortening A | Shortening B |
|---|---|---|
| At 50° F. (10° C.) | 25.9 | 28.9 |
| At 70° F. (21° C.) | 19.4 | 25.0 |
| At 80° F. (27° C.) | 15.2 | 19.0 |
| At 92° F. (33° C.) | 13.4 | 15.8 |

-continued

| At 105° F. (41° C.) | 12.2 | 3.0 |
|---|---|---|
| Solid Fat Content Curve Slope | Shortening A | Shortening B |
| Between 50° F. (10° C.) and 105° F. (41° C.) | −0.25 | −0.47 |
| Between 70° F. (21° C.) and 92° F. (33° C.) | −0.27 | −0.42 |
| Between 50° F. (10° C.) and 70° F. (21° C.) | −0.33 | −0.20 |
| Penetration | | |

Shortening A: 180–120 mm/10
Shortening B: 150 mm/10

Discussion

Shortening A is found to have a smooth, creamy, non-grainy appearance. Shortening B, on the other hand, is grainy in appearance. This is thought to be the result of the SFC curves of the two shortenings. Shortening A has an SFC curve slope between 50° F. (10° C.) and 105° F. (41° C.) of −0.25, a slope that is within the 0.00 to −0.40 range of the present invention. Additionally, the slope between 70° F. (21° C.) and 92° F. (33° C.) is −0.27 and the slope between 50° F. (10° C.) and 70° F. (21° C.) is −0.33, slopes within the preferred 0.40 maximum slope in the present invention for any given 20° F. (11° C.) temperature range. Shortening B, in contrast, does not fall within the present invention, because its overall 50° F. (10° C.) to 105° F. (41° C.) slope is −0.47.

EXAMPLE 2

Butter-flavored shortenings are prepared, the first shortening containing only triglyceride fat, and the second shortening containing sucrose fatty acid polyesters in addition to the triglycerides. The compositions of these shortenings are as follows:

| | Triglyceride Shortening | Polyester and Triglyceride Shortening |
|---|---|---|
| Liquid soybean oil (I.V. 107) | 39.8% | 58.5% |
| Intermediate melting soybean oil (I.V. about 43) | 50.9% | — |
| Intermediate melting sucrose polyester made from a blend of partially and nearly completely hardened soybean oil methyl esters (12% solids at body temperature, I.V. 44.8, viscosity 30 poise, liq./sol. stability >95%) | — | 23.0% |
| Sucrose polyester hardstock, made from nearly completely hardened soybean oil methyl esters (I.V. 8) | — | 10.0% |
| Palm hardstock (I.V. 3) | 5.6% | 4.0% |
| Mono- and diglyceride emulsifier | 3.7% | 4.5% |
| Butter flavor A | 80.6 ppm | 80.6 ppm |
| Butter flavor B | 42.4 ppm | 42.4 ppm |

The shortening containing both polyester and triglyceride had the following solid fat content and penetration:

| Solid Fat Content | Penetration at 70° F. |
|---|---|
| At 50° F. (10° C.): 25.9 | 180–210 mm/10 |
| At 70° F. (21° C.): 19.4 | |
| At 80° F. (27° C.): 15.2 | |
| At 92° F. (33° C.): 13.4 | |
| At 105° F. (41° C.): 12.2 | |

When tasted by expert oil flavorists, the butter-flavored shortening containing sucrose polyesters is perceived to have more butter flavor than the butter-flavored triglyceride shortening, even though the shortenings contain the same concentration of butter flavor.

EXAMPLE 3

Shortenings are prepared as shown in the following table:

| Ingredient | Shortening A | Shortening B | Shortening C | Shortening D | Shortening E | Shortening F | Shortening G |
|---|---|---|---|---|---|---|---|
| Soft oil - liquid soybean oil (I.V. about 107) | 53.5% | 59.5% | 58.5% | 58.5% | 53.1% | 54.0% | 53.1% |
| Intermediate melting soybean oil (I.V. about 43) | 3.5% | — | — | — | — | 4.0% | — |
| Palm triglyceride hardstock (I.V. about 3) | 3.5% | 3.0% | 4.0% | 4.0% | 7.4% | 4.0% | 7.4% |
| Emulsifier - mono- and diglycerides | 4.5% | 4.5% | 4.5% | 4.5% | 4.5% | 4.5% | 4.5% |
| Sucrose fatty acid esters made from a blend of partially and nearly completely hardened soybean oil methyl esters (about 10–22% solids at body temperature) | 27.4% | 23.0% | 23.0% | 29.3% | 35.0% | 30.0% | 35.0% |
| -viscosity | about 32 poise | 209 poise | 30 poise | about 85 poise | not measured | not measured | 209 poise |
| -liquid/solid | about | 90% | 95% | 100% | not | not | not |

-continued

| Ingredient | Shortening A | Shortening B | Shortening C | Shortening D | Shortening E | Shortening F | Shortening G |
|---|---|---|---|---|---|---|---|
| stability | 93% | | | | measured not | measured not | measured |
| -iodine value | 49.7 | 37.1 | 44.8 | 43 | measured | measured | 37.1 |
| Sucrose fatty acid esters made from nearly completely hardened soybean oil methyl esters (I.V. 8) | 7.6% | 10.0% | 10.0% | 5.2% | — | 3.0% | — |
| SFC at 50° F. (10° C.) | 28.6 | 28.2 | 25.9 | 27.8 | 33.3 | 30.3 | 33.4 |
| 70° F. (21° C.) | 20.4 | 22.0 | 19.4 | 18.8 | 22.9 | 19.9 | 24.6 |
| 80° F. (27° C.) | 15.6 | 17.6 | 15.2 | 14.1 | 18.5 | 15.0 | 19.0 |
| 92° F. (33° C.) | 13.7 | 16.2 | 13.4 | 11.5 | 10.0 | 10.3 | 11.9 |
| 105° F. (41° C.) | 8.8 | 13.0 | 12.2 | 7.8 | 0.0 | 4.9 | 5.6 |
| Slope - | | | | | | | |
| 50° F. (10° C.)-70° F.(21° C.) | −0.41 | −0.31 | −0.33 | −0.45 | −0.52 | −0.52 | −0.44 |
| 70° F. (21° C.)-92° F.(33° C.) | −0.31 | −0.26 | −0.27 | −0.33 | −0.59 | −0.44 | −0.58 |
| 50° F. (10° C.)-105° F.(41° C.) | −0.36 | −0.28 | −0.25 | −0.36 | −0.61 | −0.46 | −0.51 |
| Penetration at 70° F. (mm/10) | 180-200 | 300-390 | 180-210 | 220-315 | 110-150 | 160-220 | 80-365 |
| Grainy (G)/ Non-Grainy (NG) | NG | NG | NG | NG | G | G | G |

Shortenings A through D are made according to the present invention. Specifically, these shortenings all have SFC curve slopes between 0.00 and 0.40 over the temperature range of 50° F. (10° C.) to 105° F. (41° C.). As a result, non-grainy shortenings are produced. Shortenings E, F and G, on the other hand, have SFC curve slopes that are outside the 0.00 to 0.40 range. These shortenings have an undesirable grainy appearance.

What is claimed is:

1. A shortening composition comprising:
   (a) from about 10% to about 80% by weight intermediate melting polyol fatty acid polyesters having at least 4 fatty acid ester groups, wherein the polyols are selected from the group consisting of sugars and sugar alcohols containing 4 to 8 hydroxyl groups and mixtures thereof and wherein each fatty acid group has from about 8 to about 22 carbon atoms; and wherein the polyol polyesters have: (i) a non-Newtonian plastic rheology at 100° F. (37.8° C.) and has a viscosity of not less than about 15 poise at 100° F. (37.8° C.) after 10 minutes of steady shear at 10 sec.$^{-1}$, (ii) a liquid/solid stability of not less than 90 percent at 100° F. (37.8° C.), and (iii) an iodine value between 25 and 55;
   (b) from about 20% to about 88% by weight soft oil comprising from about 0% to about 50% liquid polyol fatty acid polyesters having an iodine value between 60 and 130 and from about 20% to about 88% liquid triglycerides having an iodine value between 70 and 130;
   (c) from about 2% to about 20% by weight hardstock fat comprising from about 0% to about 10% hardstock polyol fatty acid esters and from about 2% to about 20% hardstock triglycerides;
   (d) from about 0% to about 50% by weight intermediate melting triglycerides; and
   (e) from about 0% to about 15% by weight other shortening ingredients;
   (f) wherein the shortening has a Solid Fat Content (SFC) such that the overall slope of the SFC curve between 50° F. (10° C.) and 105° F. (41° C.) is between 0.00 and −0.40; and
   (g) wherein the shortening has a penetration between about 120 mm/10 and about 400 mm/10 at 70° F. (21° C.).

2. A shortening according to claim 1 wherein the overall SFC curve slope is between 0.00 and −0.30.

3. A shortening according to claim 2 wherein the overall SFC curve slope is between 0.00 and −0.20.

4. A shortening according to claim 1 wherein the maximum negative or positive slope of the SFC curve between any given 20° F. (11° C.) temperature range between 50° F. (10° C.) and 105° F. (41° C.) is about 0.40.

5. A shortening according to claim 4 wherein the maximum slope is about 0.30.

6. A shortening according to claim 5 wherein the maximum slope is about 0.20.

7. A shortening according to claim 1 wherein the shortening has a penetration between 150 mm/10 and 250 mm/10 at 70° F. (21° C.).

8. A shortening according to claim 1 comprising from about 33% to about 88% by weight intermediate melting polyol fatty acid polyesters.

9. A shortening according to claim 1 comprising from about 40% to about 65% by weight soft oil.

10. A shortening according to claim 1 wherein the soft oil is a triglyceride.

11. A shortening according to claim 1 comprising from about 3% to about 12% by weight hardstock fat.

12. A shortening according to claim 1 wherein the hardstock is a triglyceride.

13. A shortening according to claim 1 comprising from about 2% to about 15% by weight intermediate melting triglyceride.

14. A foodstuff comprising a food containing artificial or natural butter flavor and a shortening according to claim 1.

15. A shortening according to claim 1 additionally comprising butter flavor.

16. A foodstuff comprising a food containing artificial or natural cheese flavor and a shortening according to claim 1.

17. A shortening according to claim 1 wherein the intermediate melting polyol fatty acid polyesters have a yield stress of not less than about 150 dynes/cm$^2$ at 100° F. (37.8° C.).

* * * * *

UNITED STATES PATENT AND TRADEMARK OFFICE
CERTIFICATE OF CORRECTION

PATENT NO. : 4,880,657

DATED : November 14, 1989

INVENTOR(S) : Timothy B. Guffey et al.

It is certified that error appears in the above-identified patent and that said Letters Patent is hereby corrected as shown below:

Column 16, line 43, "88%" should be -- 80% --

Signed and Sealed this

Sixteenth Day of April, 1991

Attest:

HARRY F. MANBECK, JR.

Attesting Officer

Commissioner of Patents and Trademarks